United States Patent [19]
Kimura

[11] Patent Number: 5,647,310
[45] Date of Patent: Jul. 15, 1997

[54] ENGINE EXHAUST VALVE MECHANISM

[75] Inventor: Satoshi Kimura, Yokosuka, Japan

[73] Assignee: Nissan Motor Co., Ltd., Yokohama, Japan

[21] Appl. No.: 454,724

[22] Filed: May 31, 1995

[30] Foreign Application Priority Data

Jun. 9, 1994 [JP] Japan .................................. 6-127569

[51] Int. Cl.⁶ ........................................................ F01L 1/08
[52] U.S. Cl. ........................................................ 123/90.6
[58] Field of Search ............................. 123/90.15, 90.17, 123/90.6; 74/567; 251/251

[56] References Cited

U.S. PATENT DOCUMENTS

| | | | |
|---|---|---|---|
| 4,538,559 | 9/1985 | Imamura et al. | 123/90.6 |
| 4,909,196 | 3/1990 | Nagahiro et al. | 123/90.6 |
| 5,215,048 | 6/1993 | Kaiser et al. | 123/90.6 |
| 5,309,872 | 5/1994 | Filippi et al. | 123/90.6 |

*Primary Examiner*—Weilun Lo
*Attorney, Agent, or Firm*—Foley & Lardner

[57] ABSTRACT

In an exhaust valve of a reciprocating engine provided with a cam that rotates in synchronism with a crankshaft, and valve body opened by this cam, the cam shape is improved. The maximum value of the valve opening acceleration of the valve body is set to be less than the maximum value of the valve closing acceleration. Alternatively, the maximum value of the valve opening acceleration is set to be less than the maximum value determined by the operating limits of the valve body. In this way, the change of exhaust blowdown is made more gradual, and exhaust pulsation noise is reduced.

6 Claims, 11 Drawing Sheets

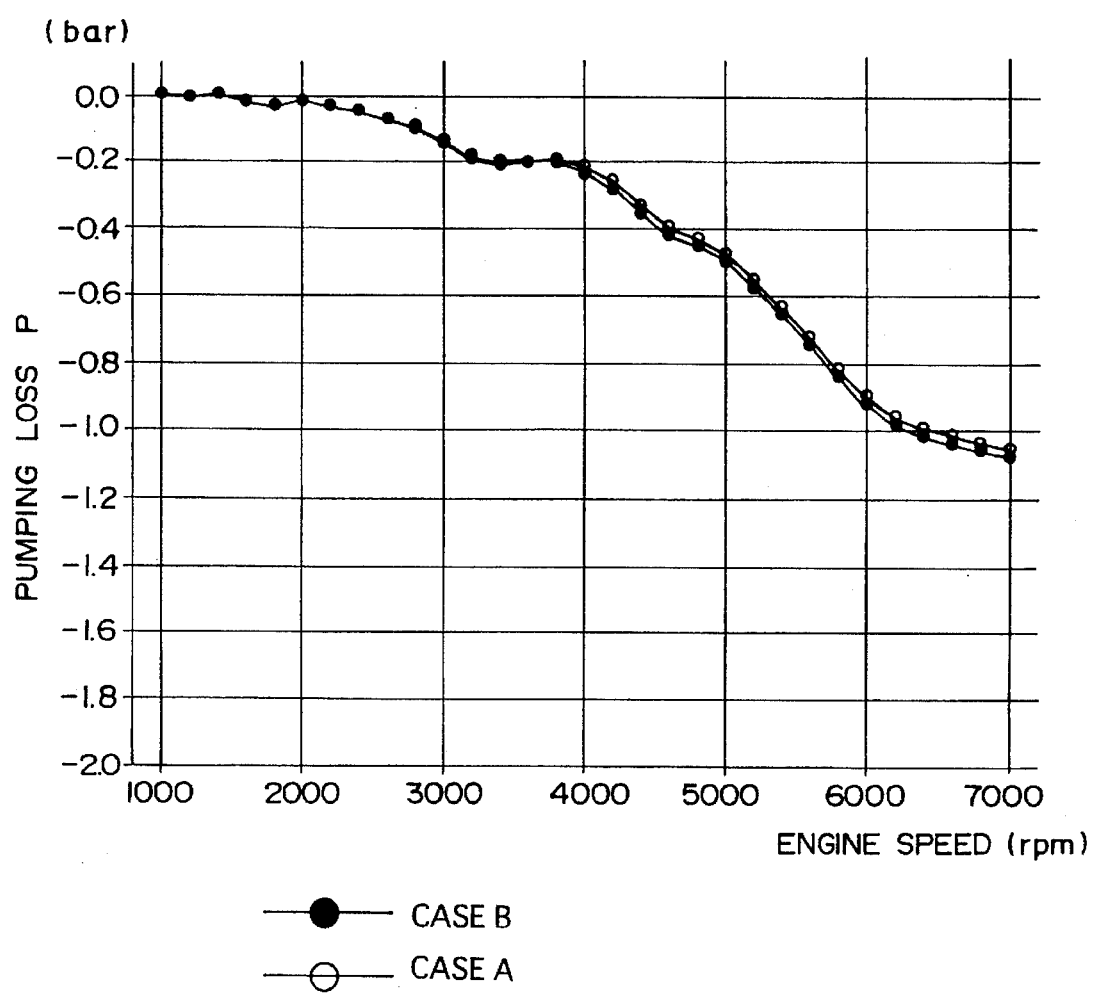
F I G. 6

5,647,310

ENGINE EXHAUST VALVE MECHANISM

FIELD OF THE INVENTION

This invention relates to an exhaust valve of a reciprocating engine, and more specifically, to an improvement of a cam that opens and closes an exhaust valve.

BACKGROUND OF THE INVENTION

In a reciprocating engine such as an automobile engine, the exhaust valve is generally driven by a cam that rotates in synchronism with the crankshaft.

In this case, if the valve is opened suddenly in an effort to maintain the exhaust flowrate, there is a rapid expulsion or blowdown of combustion gases from the engine so that exhaust pulsation noise increases.

Tokkai Hei 1-159417 published by the Japanese Patent Office in 1989, for example, discloses an arrangement for an engine having two exhaust valves in each cylinder, and by changing the shape of the cams driving the exhaust valves, these valves are made to open at different timings so that blowdown occurs more gradually for the cylinders as a whole.

However, as a cam has to be provided for each exhaust valve, the construction of the valve apparatus becomes more complex and costly.

This system moreover cannot be applied to an engine having only one exhaust valve.

SUMMARY OF THE INVENTION

It is therefore an object of this invention to reduce exhaust pulsation noise in a reciprocating engine irrespective of the number of exhaust valves equipped to each cylinder.

It is a further object of this invention to reduce exhaust pulsation noise of a reciprocating engine without incurring high cost.

It is still a further object of this invention to reduce, in particular, high frequency components of exhaust pulsation noise of a reciprocating engine.

In order to achieve the above objects, this invention provides an exhaust valve mechanism of an engine comprising a crankshaft rotating in accordance with an operation of the engine, a cam that rotates in synchronism with the crankshaft, and a valve body that is opened and closed by the cam. This cam has a shape such that the maximum value of the valve body opening acceleration is less than the maximum value of the valve body closing acceleration.

The maximum value of valve body opening acceleration is preferably set to be within a range of 60 to 90% of the maximum value of valve body closing acceleration.

It is also preferable the cam gradually increases the valve body opening acceleration after the cam starts to open the valve body up to approximately 20 degrees before the crankshaft reaches the bottom dead center of its rotation cycle.

According to another aspect of this invention, the cam has a shape such that the maximum value of the valve body opening acceleration is less than a value determined by mechanical operating limits of the valve body.

The maximum value of valve body opening acceleration is preferably set to be within a range of 60 to 90% of the value determined by the mechanical operating limits.

It is also preferable that the cam gradually increases the valve body opening acceleration after the cam starts to open the valve body up to approximately 20 degrees before the crankshaft reaches the bottom dead center of its rotation cycle.

The details as well as other features and advantages of this invention are set forth in the remainder of the specification and are shown in the accompanying drawings.

BRIEF DESCRIPTION OF THE DRAWINGS

FIG. 6 is a graph showing a relation between a pumping loss and the engine speed, according to this invention.

DESCRIPTION OF THE PREFERRED EMBODIMENTS

Figure 1:
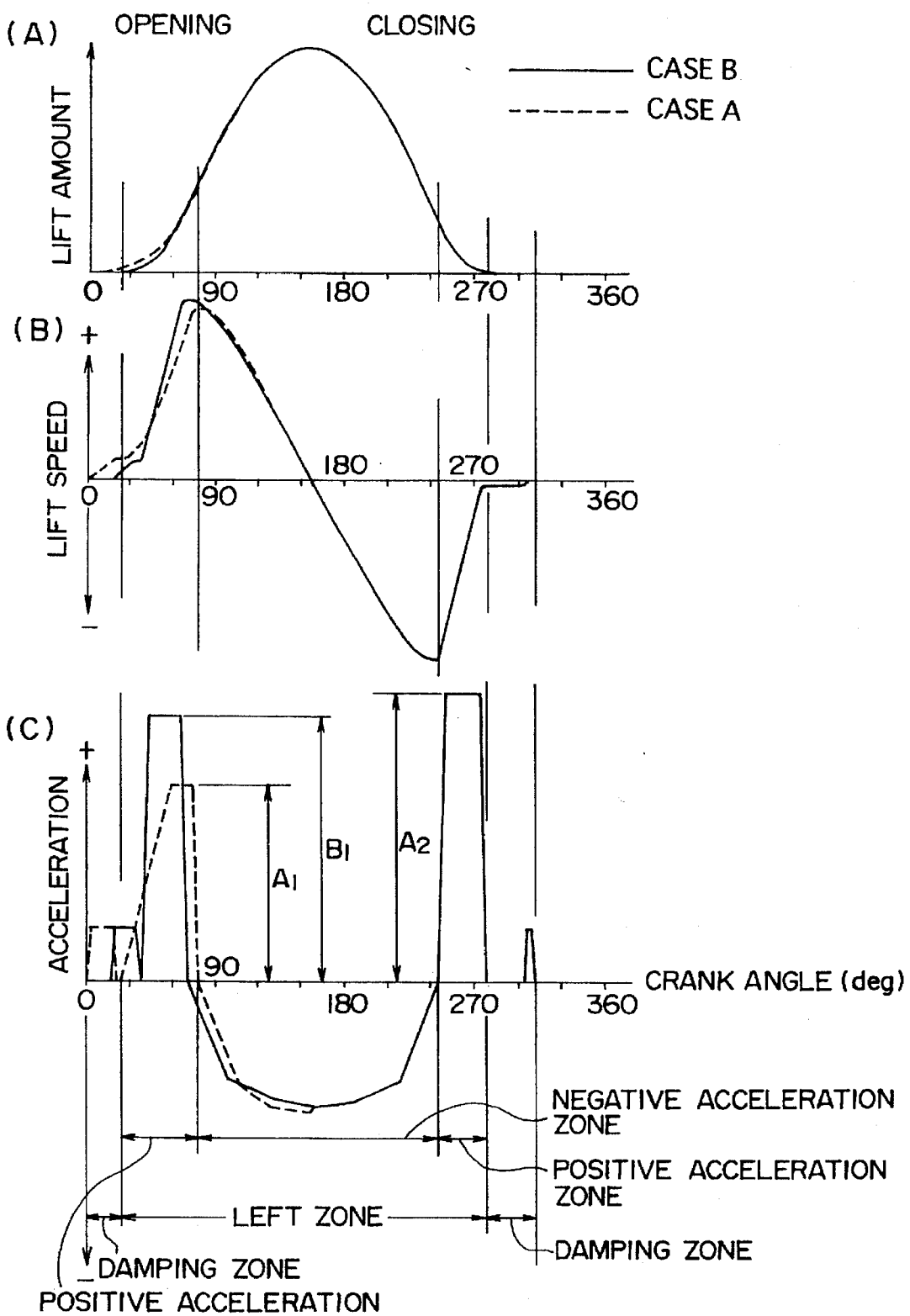
FIG. 1 is a set of graphs showing lift amount, lift speed and lift acceleration of an exhaust valve for each rotation of a crankshaft according to this invention.
Figure 11:
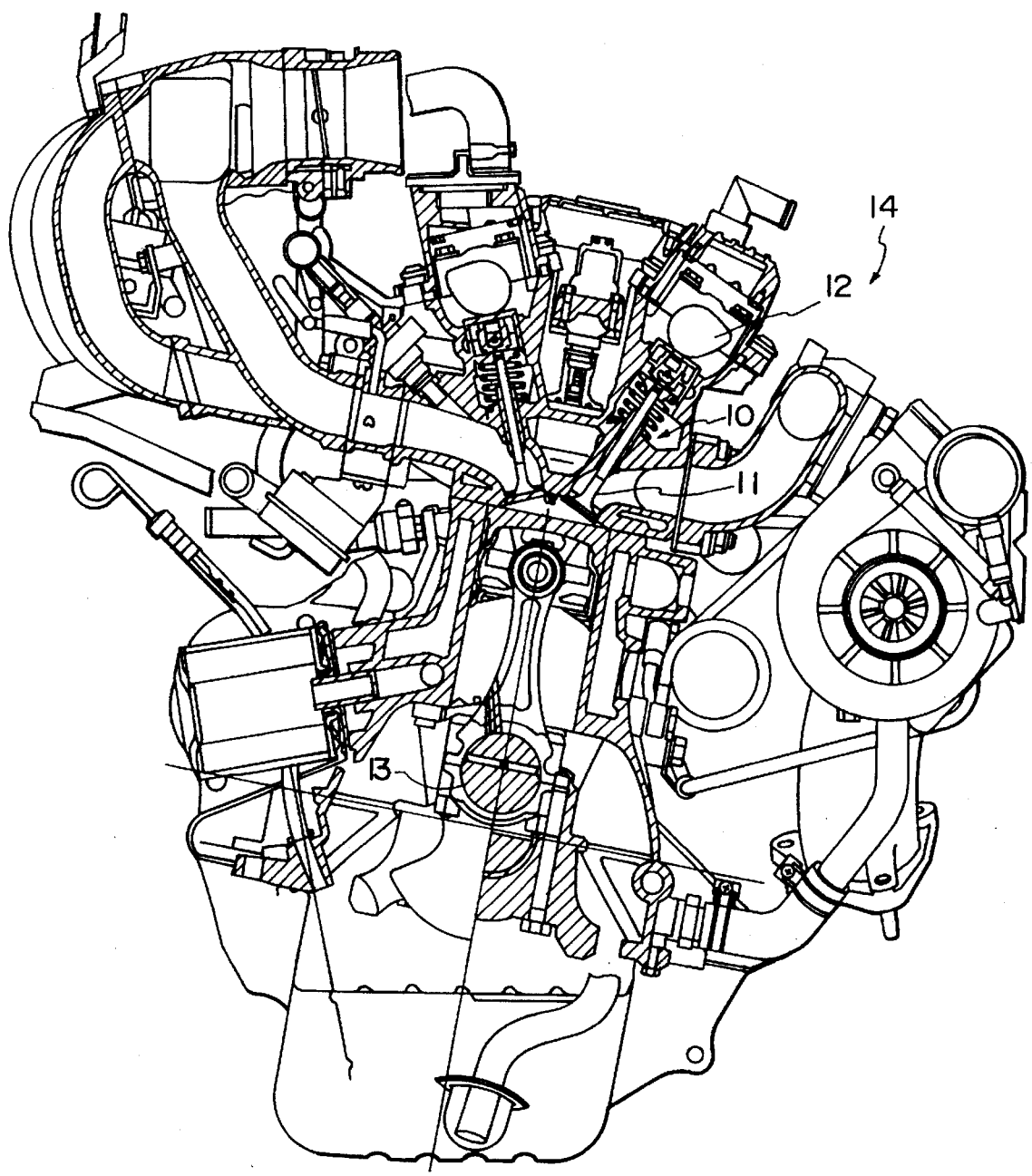
FIG.11 is a longitudinal sectional view of an engine to which this invention is applied.

Referring to FIG. 1 of the drawings, a preferred embodiment of an exhaust valve 10 according to this invention has a lift amount shown by a dotted line of FIG. 1(A), a lift speed shown by a dotted line of FIG. 1(B) and a lift acceleration shown by a dotted line of FIG. 1(C). Solid lines in FIG. 1 represent a first embodiment of the invention. Hereinafter, the preferred embodiment will be referred to as Case A and the first embodiment will be referred to as Case B. The Case A and Case B references are employed throughout the figures. As shown in FIG. 11, this exhaust valve 10 is installed in a reciprocating engine 14 that has a crankshaft 13. The engine 14 is also equipped with a cam 12 that rotates in synchronism with the crankshaft 13 and opens and closes the exhaust valve 10 by pushing a valve body 11.

As shown by FIG. 1, when the exhaust valve 10 is opened, its opening speed gradually increases according to a predetermined acceleration in a positive direction (the direction in which the lift amount increases) in a damping zone. Subsequently, it separates from a valve seat by a predetermined amount while lifting at constant speed, and enters a lift zone at a predetermined crank angle.

In the positive acceleration region of the lift zone, the acceleration first gradually increases in a positive direction in direct proportion to increase of crank angle, and lifts to a maximum acceleration $A_1$ in a positive direction when the valve is opening. The exhaust valve then lifts while its speed gradually increases in a positive direction.

After maintaining the maximum acceleration $A_1$ in the positive direction for a predetermined crank angle when the valve is opening, the valve enters a negative acceleration wherein the valve decelerates with an acceleration in the negative direction.

In this negative acceleration region, the speed in the positive direction is gradually decreased until the maximum lift position of the valve, and when the speed=0 at maximum lift, the direction of the speed changes to negative so that the valve is driven in the seating direction, i.e. the direction in which the lift amount decreases.

After the maximum lift position, the speed in a negative direction increases due to the negative acceleration, and the valve enters the positive acceleration region when the valve is closing.

In the positive acceleration region when the valve is closing, the speed decreases in the negative direction at a maximum positive acceleration $A_2$. This acceleration $A_2$ is maintained, and after the closing speed of the valve has slowed down, the valve is gradually seated in the damping zone when the valve is closing.

It is preferable that the maximum value $A_1$ of the positive acceleration when the valve is opening, is set in the range from 60 to 90% of the maximum positive acceleration $A_2$ when the valve is closing. According to Case A, the preferred embodiment, it is set to 70%, while Case B, the first embodiment, it is set to 90% for comparison purposes.

The maximum acceleration in Case A when the valve is closing is set to an operating limit tolerance value such that bouncing does not occur at the highest set engine speed.

According to Case B, a maximum acceleration $B_1$ when the valve is opening is set to the operating tolerance limit of the valve, but the maximum acceleration in Case A when the valve is opening according to this embodiment, is set to 75% of this maximum value $B_1$.

Further, the opening timing of the valve in Case A is set to be earlier than in Case B by a predetermined crank angle. Even when the maximum acceleration $A_1$ when the valve is opening is 60 to 90% of the maximum acceleration $A_2$ when the valve is closing in Case A, the product of the valve opening area and opening time is of the same order to that of Case B.

Figure 2:
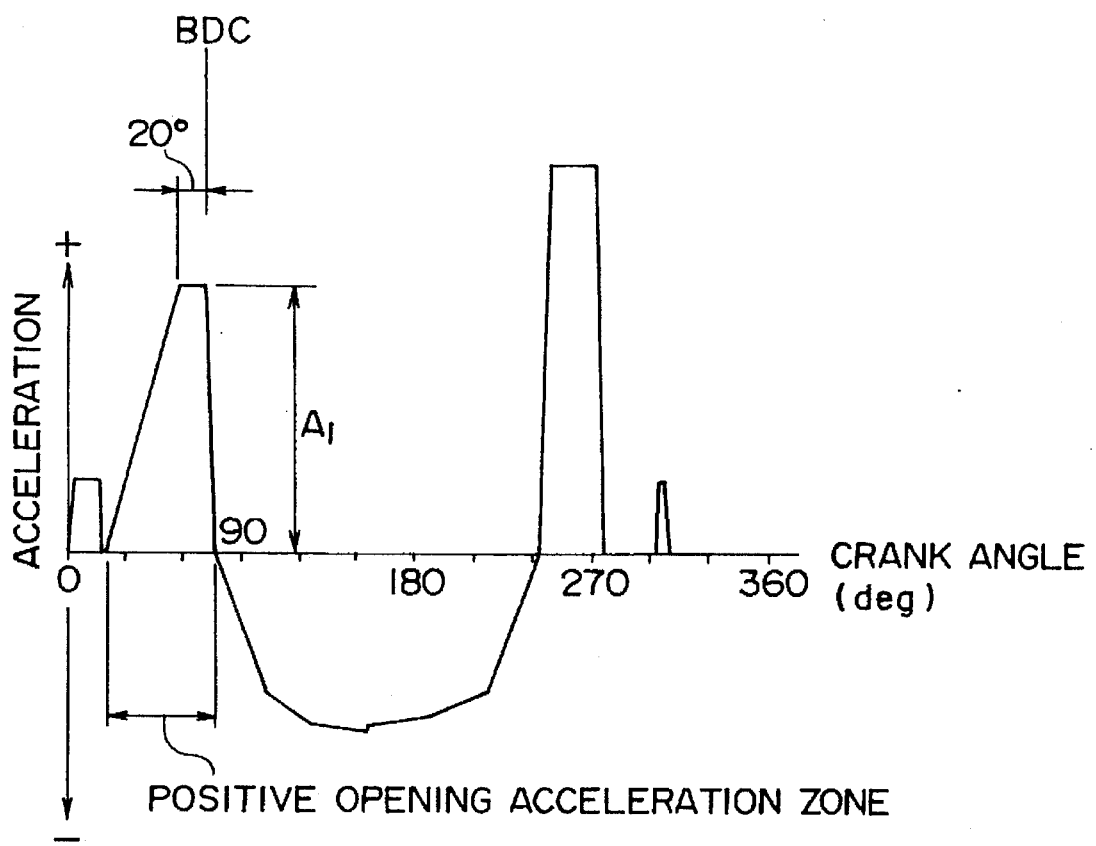
FIG. 2 is a graph showing a relation between the lift acceleration of the exhaust valve and crankshaft rotation angle according to this invention.

As shown in FIG. 2, in the positive acceleration region when the valve of Case A is opening, the position at which the maximum acceleration $A_1$ is reached is set approximately 20 degrees before the bottom dead center of the crankshaft shown by BDC in the figure. In this way, the speed at which the valve opens up to 20 degrees before the bottom dead center is suppressed so that the valve opens gradually.

According to this Case A exhaust valve, therefore, the speed at which the valve opens is more gradual than in Case B as can be seen from FIG. 1(B).

Figure 3:
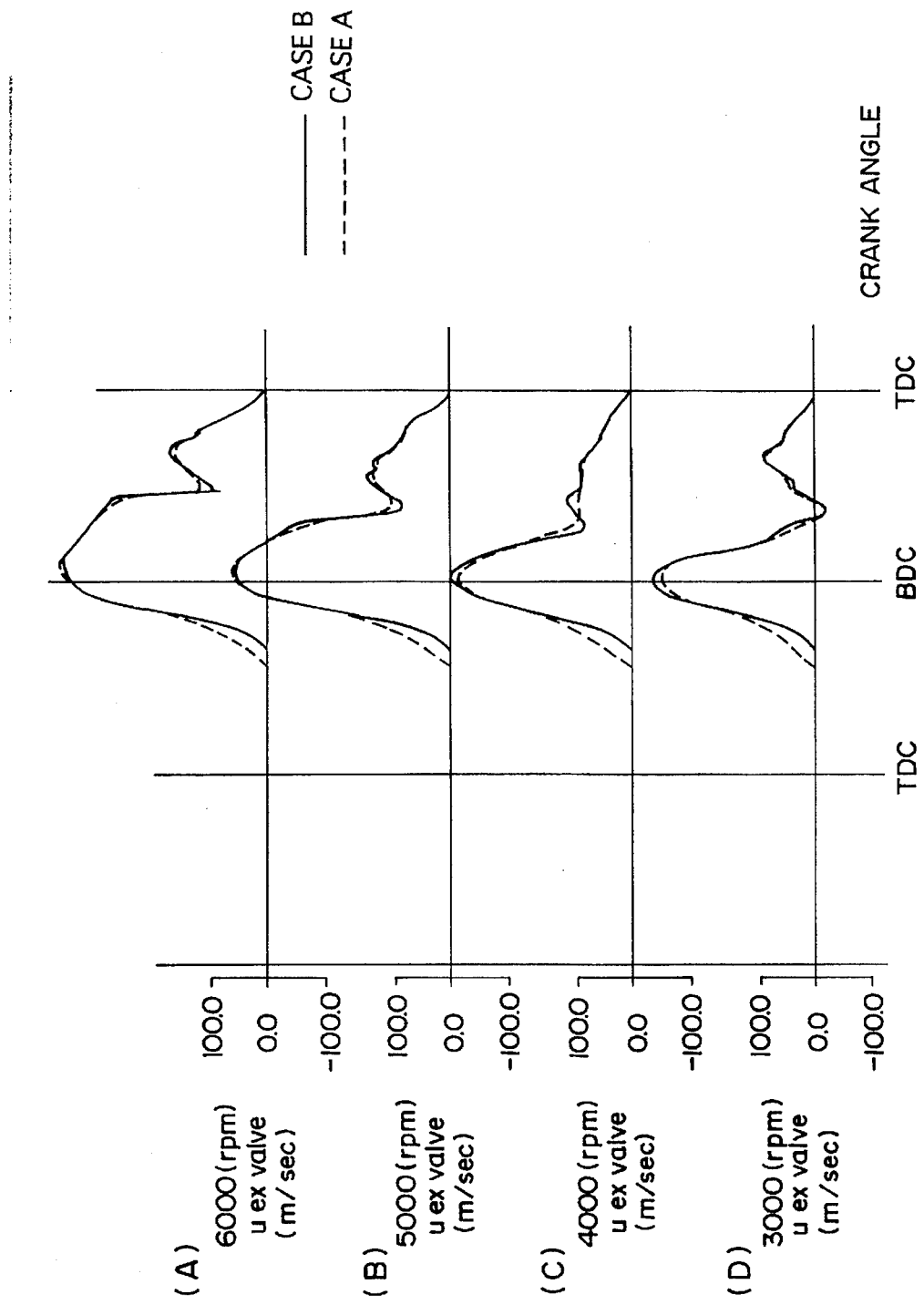
FIG. 3 is a set of graphs showing a relation between an exhaust velocity at the exhaust valve and the crankshaft rotation angle at various engine speeds according to this invention.
Figure 4:
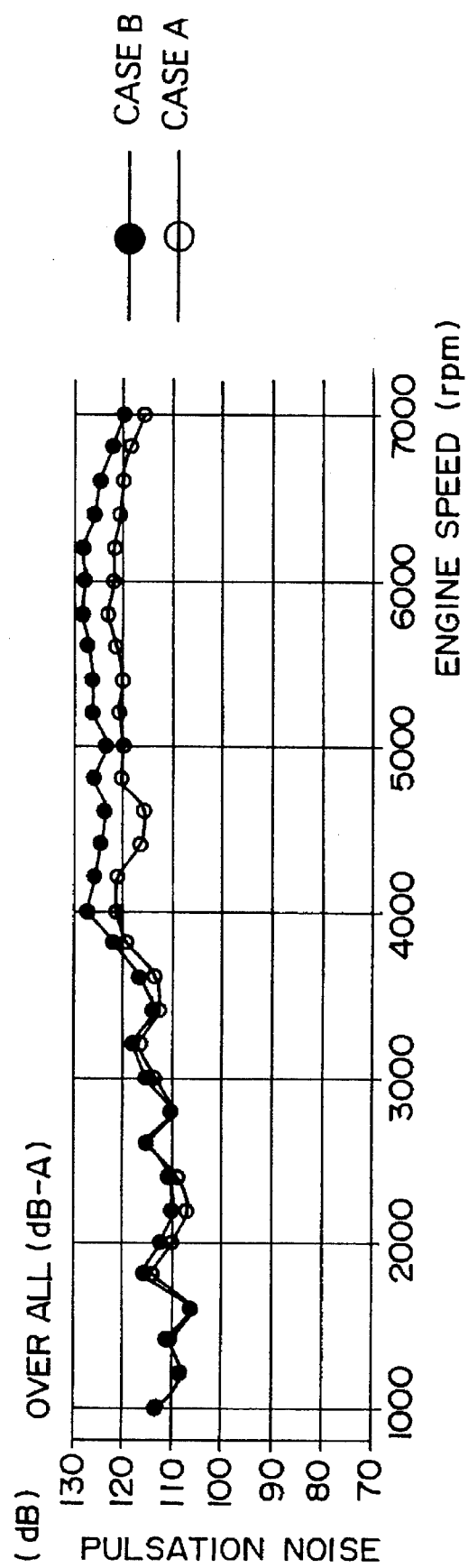
FIG. 4 is a graph showing the relation between an exhaust pulsation noise and engine speed, according to this invention.

As shown by FIGS. 3(A)-3(B), the rise of the exhaust valve in Case A, as represented by dotted lines, vales more gradually than in Case B which is represented by the solid line in the figure for engine speeds in the range 3000-6000 rpm. As shown by FIG. 4, the exhaust pulsation noise according to Case A of this invention decreases remarkably in the vicinity of 2000 rpm and above 3500 rpm, and high frequency components of the pulsation noise are particularly attenuated.

Figure 5:
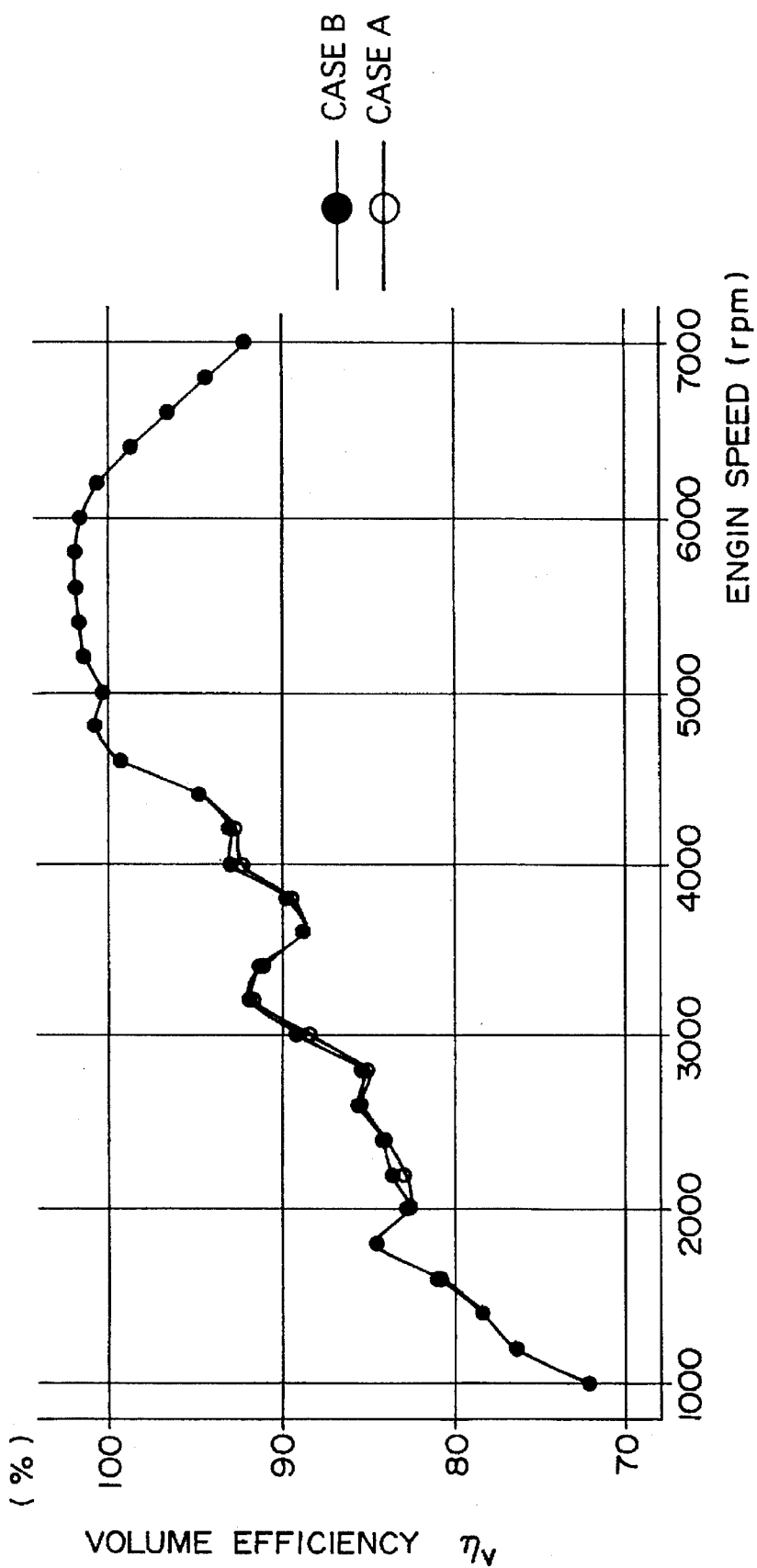
FIG. 5 is a graph showing a relation between a volume efficiency and the engine speed, according to this invention.

The exhaust valve timing of Case A, also, is advanced compared to Case B as shown in FIG. 1, hence the product of the valve opening area and opening time does not decrease in Case A. As a result, decrease of engine volume efficiency and increase of pumping loss in Case A are far less than in Case B, as shown in FIG. 5 and FIG. 6, and hence pulsation noise is reduced without any decrease of engine efficiency.

The reason why the maximum acceleration $A_1$ during valve opening was arranged to be 60 to 90% of the maximum acceleration during valve closing, will now be described.

Figure 7:
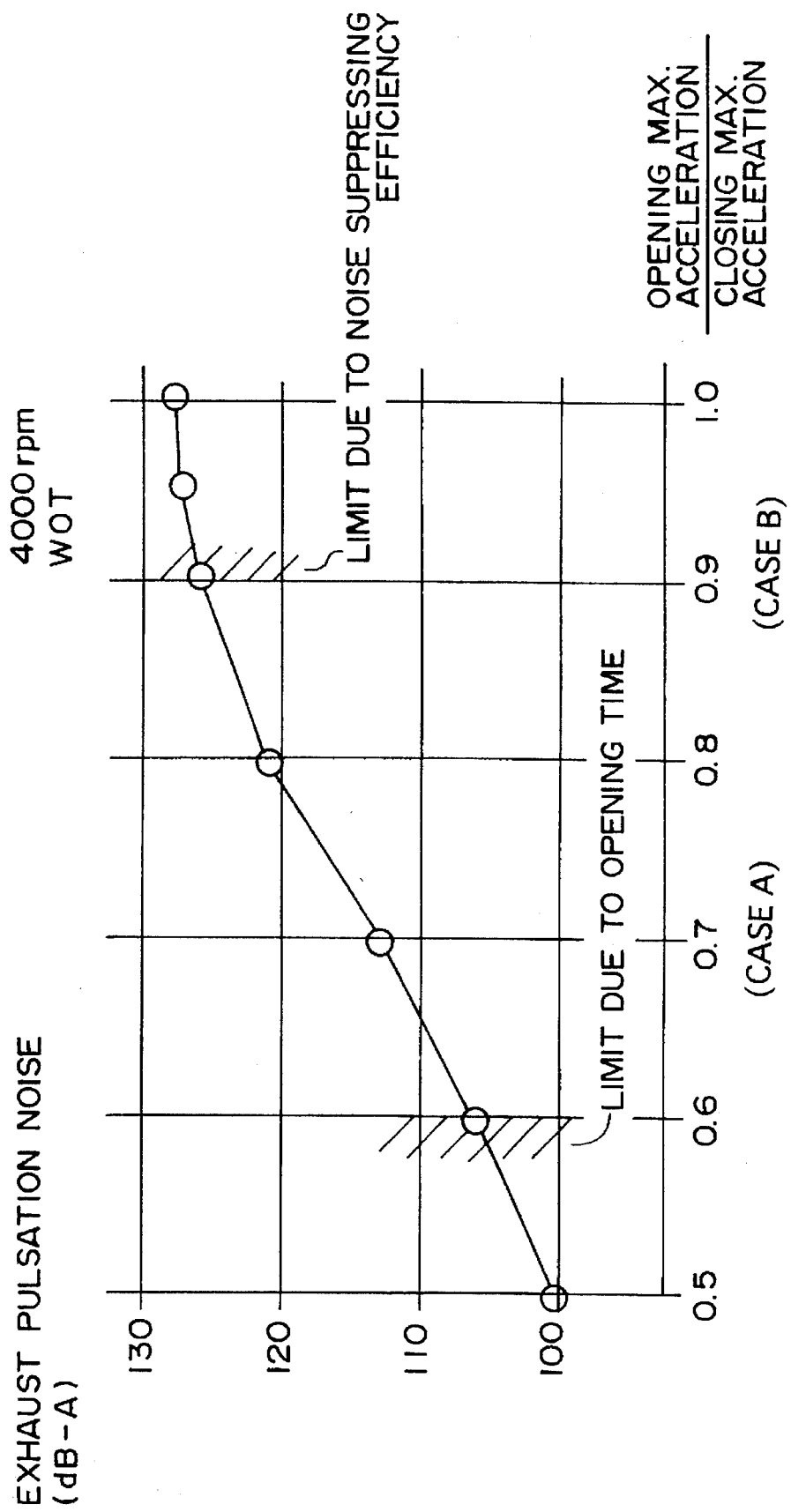
FIG. 7 is a graph showing a relation between a maximum acceleration ratio and the exhaust pulsation noise according to this invention.
Figure 8:
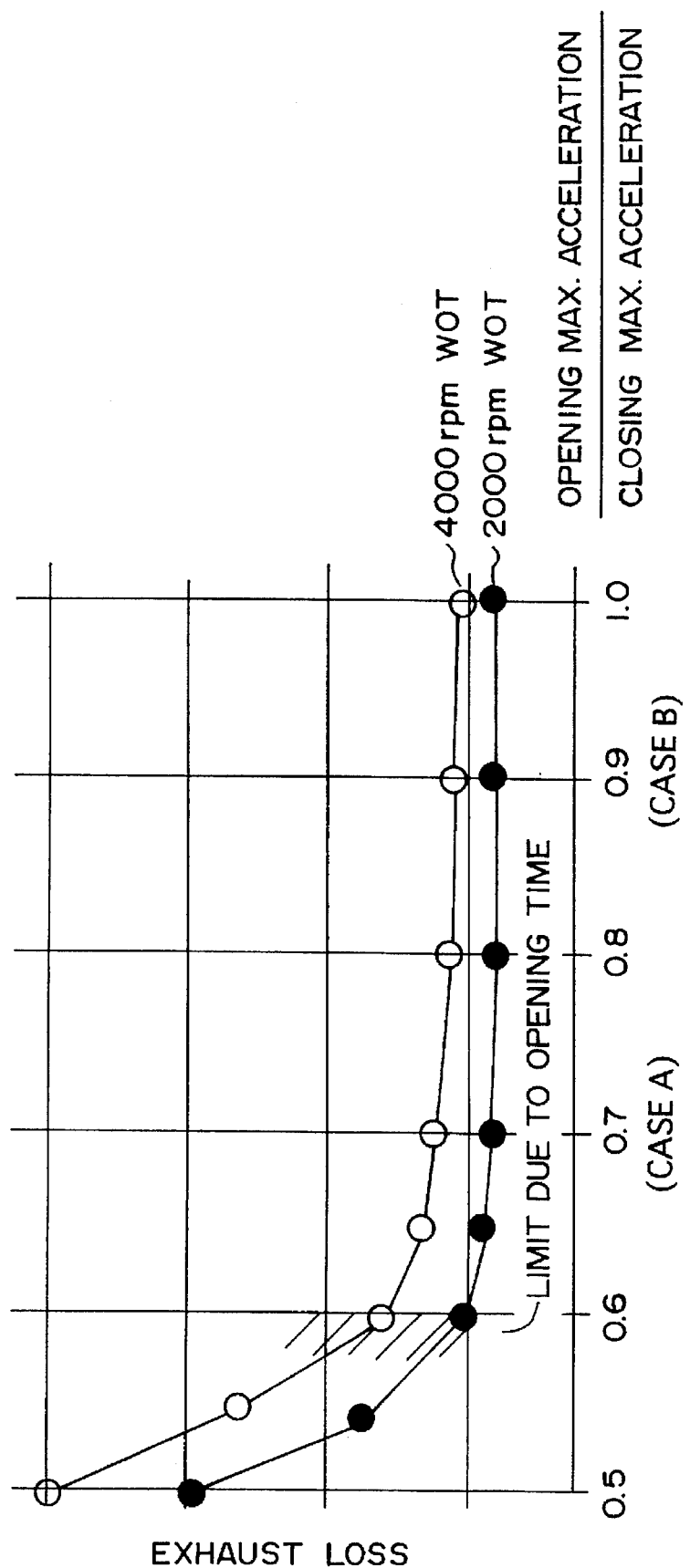
FIG. 8 is a graph showing a relation between the maximum acceleration ratio and an exhaust loss, according to this invention.

FIGS. 7 and 8 show, according to a numerical simulation carried out by the inventors, the relation between maximum acceleration ratio, exhaust pulsation noise and exhaust loss, the maximum acceleration ratio $A_1/A_2$ being defined as the ratio of the maximum acceleration $A_1$ during valve opening and the maximum acceleration $A_2$ during valve closing.

In FIG. 7, the reduction of exhaust pulsation noise is particularly marked when the maximum acceleration ratio is 0.9 or less, and the pulsation noise moreover decreases with decrease of maximum acceleration ratio.

As shown in FIG. 8, however, when the maximum acceleration ratio is less than 0.6, the opening time must be advanced in order to maintain the product of the valve opening area and opening time.

For this reason, a value of 0.6-0.9 is set as the maximum acceleration ratio for decreasing pulse noise and suppressing increase of exhaust loss.

Next, the reason why the acceleration is increased gradually in Case A to 20 degrees before the bottom dead center, that is the position at which maximum acceleration is reached, will be described. The rise of exhaust blowdown is defined from when the valve begins opening up to the peak exhaust flowrate. According to experiments performed by the inventors, at engine speeds above 4000 rpm at which pulse noise increases, the peak flowrate is obtained approximately 20 degrees before the bottom dead center. Hence, by opening the valve slowly until the blowdown flowrate reaches a peak, the risk of blowdown is damped, pulse noise is reduced, and high frequency components in particular are reduced.

According to this invention, therefore, pulsation noise can be reduced without the need for a plurality of cams having different timing as in the prior art. In other words, the pulsation noise can be reduced irrespective of the number of exhaust valves equipped to each cylinder.

Figure 9:
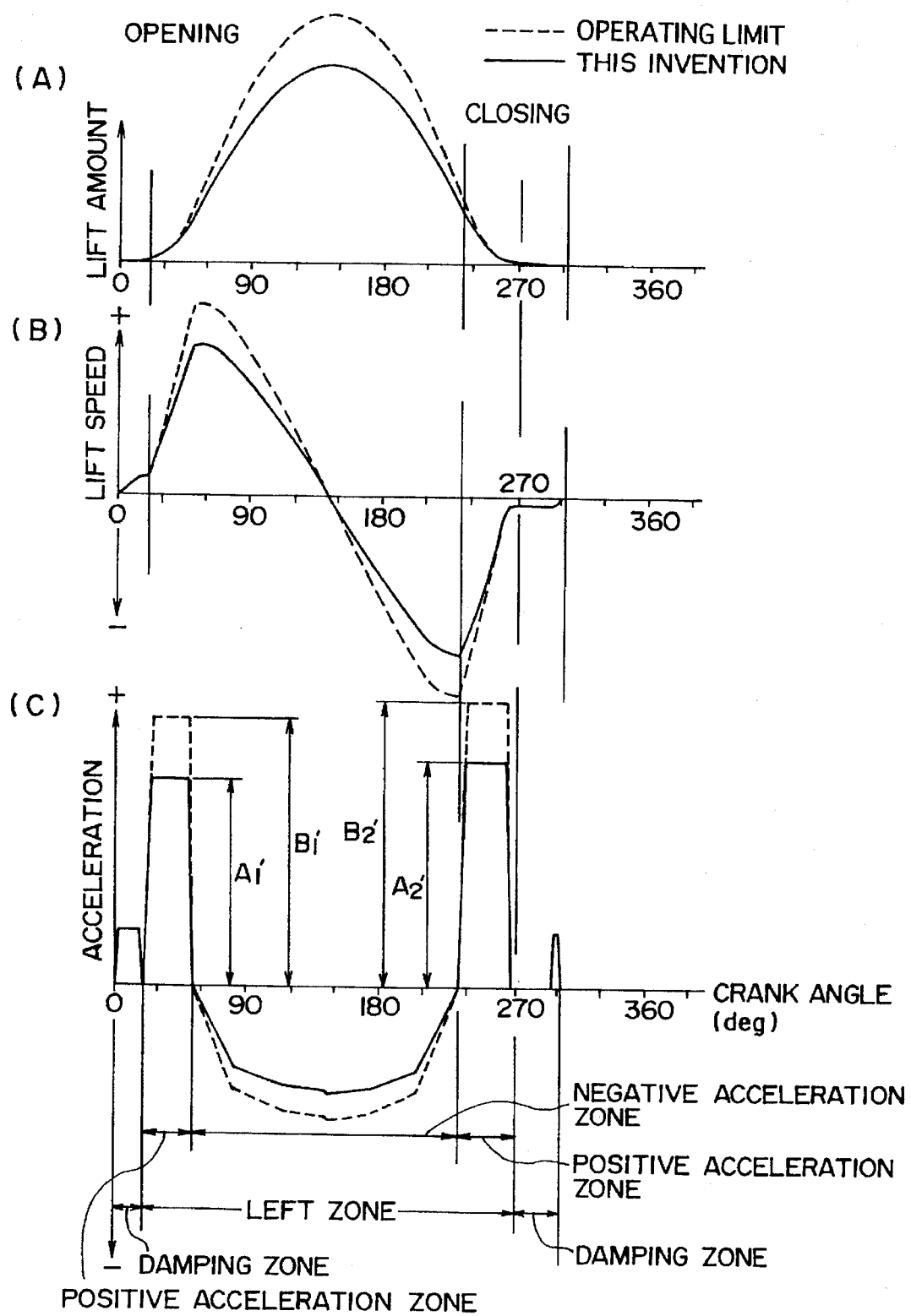
FIG. 9 is similar to FIG. 1, but showing a second embodiment of this invention.
Figure 10:
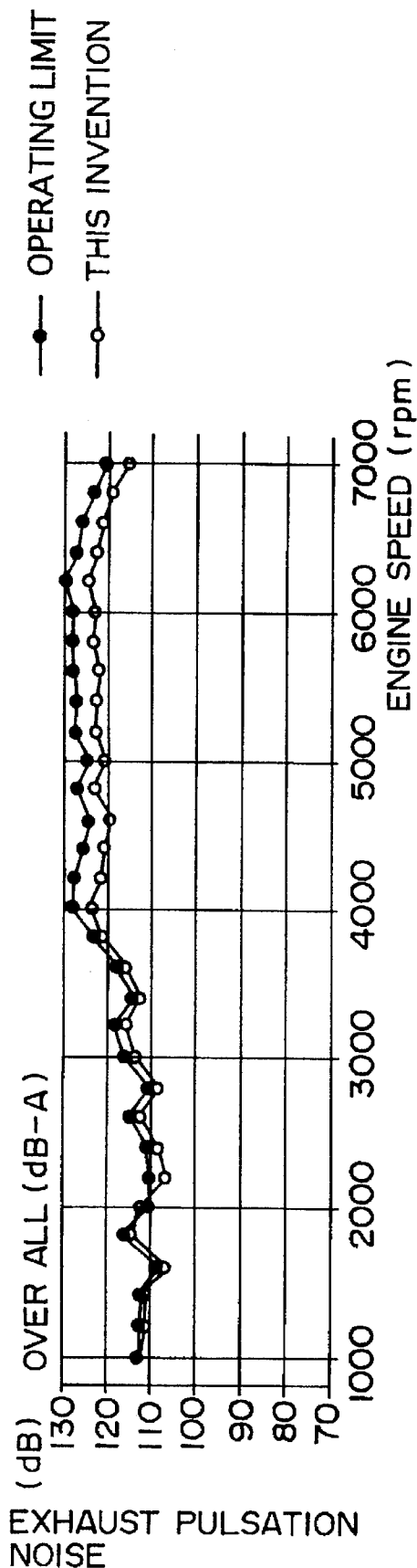
FIG. 10 is similar to FIG. 4, but showing the second embodiment of this invention.

FIGS. 9 and 10 show another embodiment of this invention.

In FIG. 9, the timing of cams in accordance with the operating limit of the valve driving cam, as discussed below, is shown by the dotted line, and the timing of cams according to this embodiment is shown by the solid line. The maximum value $A_2'$ of the acceleration when the valve is closing is set to 80% of the maximum valve $B_2'$ of the dotted line which is the operating limit of the valve. Likewise, the maximum value $A_1'$ of the acceleration when the valve is opening is set to 80% of the maximum value $B_1'$ of the dotted line. The remaining features are the same as those of the prior art.

Hence, by setting the maximum value $A_1'$, $A_2'$ of the positive acceleration to be less than the maximum values $B_1'$, $B_2'$, i.e. the operating limit, the sharp rise of blowdown is damped, exhaust pulsation noise at engine speeds in the vicinity of 2000 rpm and above 4000 rpm is remarkably reduced as shown in FIG. 10, and the silence of an internal combustion engine is improved.

The embodiments of this invention in which an exclusive property or privilege is claimed are defined as follows:

What is claimed is:

1. An exhaust valve mechanism of an engine comprising:

a crankshaft rotating in accordance with an operation of said engine, a cam that rotates in synchronism with said crankshaft, and a valve body of an exhaust valve that is opened and closed by said cam, wherein said cam has a shape such that the maximum value of the valve body opening acceleration is less than the maximum value of the valve body closing acceleration, and such that the valve body follows the profile of said cam at all operational speeds of said engine.

2. An exhaust valve mechanism as defined in claim 1, wherein said maximum value of valve body opening acceleration is set to be within a range of 60 to 90% of said maximum value of the valve body closing acceleration.

3. An exhaust valve mechanism of an engine comprising:

a crankshaft rotating in accordance with an operation of said engine, a cam that rotates in synchronism with said crankshaft, and a valve body of an exhaust valve that is opened and closed by said cam, wherein said cam has a shape such that the maximum value of the valve body opening acceleration is less than the maximum value of the valve body closing acceleration, wherein said maximum value of valve body opening acceleration is set to be within a range of 60 to 90% of said maximum value of valve body closing acceleration, and wherein a rotation cycle of said crankshaft has a bottom dead center and said cam gradually increases the valve body opening acceleration after said cam starts to open said valve body up to approximately 20 degrees before said bottom dead center.

4. An exhaust valve mechanism of an engine comprising:

a crankshaft rotating in accordance with an operation of said engine, a cam that rotates in synchronism with a crankshaft, and a valve body of an exhaust valve that is opened and closed by said cam, opening and closing acceleration of said valve body having mechanical operating limits, wherein said cam has a shape such that the maximum value of the valve body opening acceleration is less than a value determined by said operating limits such that the valve body opens gradually so as to reduce exhaust pulsation noise and such that the valve body follows the profile of said cam at all operational speeds of said engine.

5. An exhaust valve mechanism as defiled in claim 4, wherein said maximum value of valve body opening acceleration is set to be within a range of 60 to 90% of a value determined by said operating limits.

6. An exhaust valve mechanism of an engine comprising:

a crankshaft rotating in accordance with an operation of said engine, a cam that rotates in synchronism with a crankshaft, and a valve body of an exhaust valve that is opened and closed by said cam, opening and closing acceleration of said valve body having mechanical operating limits, wherein said cam has a shape such that the maximum value of the valve body opening acceleration is less than a value determined by said operating limits, wherein said maximum value of valve body opening acceleration is set to be within a range of 60 to 90% of a value determined by said operating limits, and wherein a rotation cycle of said crankshaft has a bottom dead center and said cam gradually increases the valve body opening acceleration after said cam starts to open said valve body up to approximately 20 degrees before said bottom dead center.

* * * * *